(12) United States Patent
Ressel et al.

(10) Patent No.: US 8,961,085 B2
(45) Date of Patent: Feb. 24, 2015

(54) TRANSPORT VEHICLE FOR ROTOR BLADES AND/OR TOWER SEGMENTS OF WIND POWER PLANTS AND TRANSPORT RACK FOR A TRANSPORT VEHICLE

(75) Inventors: Dirk Ressel, Großefehn (DE); Frank Lülker, Aurich (DE); Mirko Janke, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 13/639,827

(22) PCT Filed: Apr. 5, 2011

(86) PCT No.: PCT/EP2011/055282
§ 371 (c)(1),
(2), (4) Date: Dec. 19, 2012

(87) PCT Pub. No.: WO2011/124574
PCT Pub. Date: Oct. 13, 2011

(65) Prior Publication Data
US 2013/0121780 A1    May 16, 2013

(30) Foreign Application Priority Data

Apr. 7, 2010 (DE) .......................... 10 2010 003 694
Oct. 21, 2010 (DE) .......................... 10 2010 042 783

(51) Int. Cl.
*B60P 3/40* (2006.01)
*F03D 1/00* (2006.01)
*F03D 11/00* (2006.01)

(52) U.S. Cl.
CPC . *B60P 3/40* (2013.01); *F03D 1/005* (2013.01); *F03D 11/00* (2013.01); *Y02E 10/722* (2013.01)
USPC .......................................................... 410/44

(58) Field of Classification Search
USPC ........... 410/34, 53, 82, 77, 2, 45, 31, 101, 46, 410/47, 32, 33; 280/400, 404; 416/244 R, 5, 416/61, 246, 142
See application file for complete search history.

(56) References Cited

U.S. PATENT DOCUMENTS

| | | | |
|---|---|---|---|
| 1,996,695 A * | 4/1935 | Bigley, Jr. | ........................ 410/45 |
| 2,335,692 A | 11/1943 | Murray | |
| 2,725,241 A | 11/1955 | Leonard, Jr. | |
| 2,808,288 A | 10/1957 | Benson | |

(Continued)

FOREIGN PATENT DOCUMENTS

| | | |
|---|---|---|
| CA | 2 524 280 A1 | 11/2004 |
| DE | 19938017 A1 | 3/2001 |
| DE | 10 2005 060 185 A1 | 6/2007 |
| DE | 20 2009 012 068 U1 | 3/2010 |
| EP | 1 101 936 A2 | 5/2001 |
| EP | 1 659 026 A1 | 5/2006 |
| JP | 4887712 A | 10/1973 |
| JP | 551221 A | 1/1980 |
| JP | 55171644 A | 12/1980 |
| JP | 56017778 A | 2/1981 |
| JP | 61119840 A | 7/1986 |
| JP | 2113538 A | 9/1990 |
| JP | 6920 A | 1/1994 |
| JP | 2002059776 A | 2/2002 |
| JP | 2004243805 A | 9/2004 |
| WO | 03/057528 A1 | 7/2003 |
| WO | 2005/041589 A1 | 5/2004 |
| WO | 2007/147413 A1 | 12/2007 |
| WO | 2008/104185 A1 | 9/2008 |

*Primary Examiner* — Glenn Dayoan
*Assistant Examiner* — Sunsurraye Westbrook
(74) *Attorney, Agent, or Firm* — Seed IP Law Group PLLC

(57) ABSTRACT

There is provided a transport vehicle for transporting wind power installation rotor blades and/or pylon segments. The transport vehicle has a transport support structure having a main frame, a receiving frame fixedly connected to the main frame at a first angle, and a rotary displacement unit which is fixed with one end to the receiving frame and which at its second end has a blade adaptor for receiving a rotor blade or a pylon segment. The main frame spans a main plane. The rotary displacement unit has at least one first rotary mounting, wherein there is provided a second angle between the second rotary plane of the second rotary mounting.

12 Claims, 19 Drawing Sheets

(56) References Cited

U.S. PATENT DOCUMENTS

| | | |
|---|---|---|
| 4,750,785 A | 6/1988 | Helton |
| 4,866,828 A | 9/1989 | Fraser |
| 5,017,081 A | 5/1991 | Helton |
| 5,947,665 A | 9/1999 | Baur et al. |
| 6,857,609 B2 | 2/2005 | Stoianovici et al. |
| 7,303,365 B2 | 12/2007 | Wobben |
| 7,581,934 B2 | 9/2009 | Wobben |
| 7,744,318 B2 | 6/2010 | Wobben |
| 7,985,039 B2 | 7/2011 | Wobben |
| 8,602,700 B2 * | 12/2013 | Johnson .................. 410/44 |
| 2007/0177954 A1 * | 8/2007 | Kootstra et al. ............ 410/44 |
| 2008/0296197 A1 * | 12/2008 | Kootstra .................. 206/525 |

\* cited by examiner

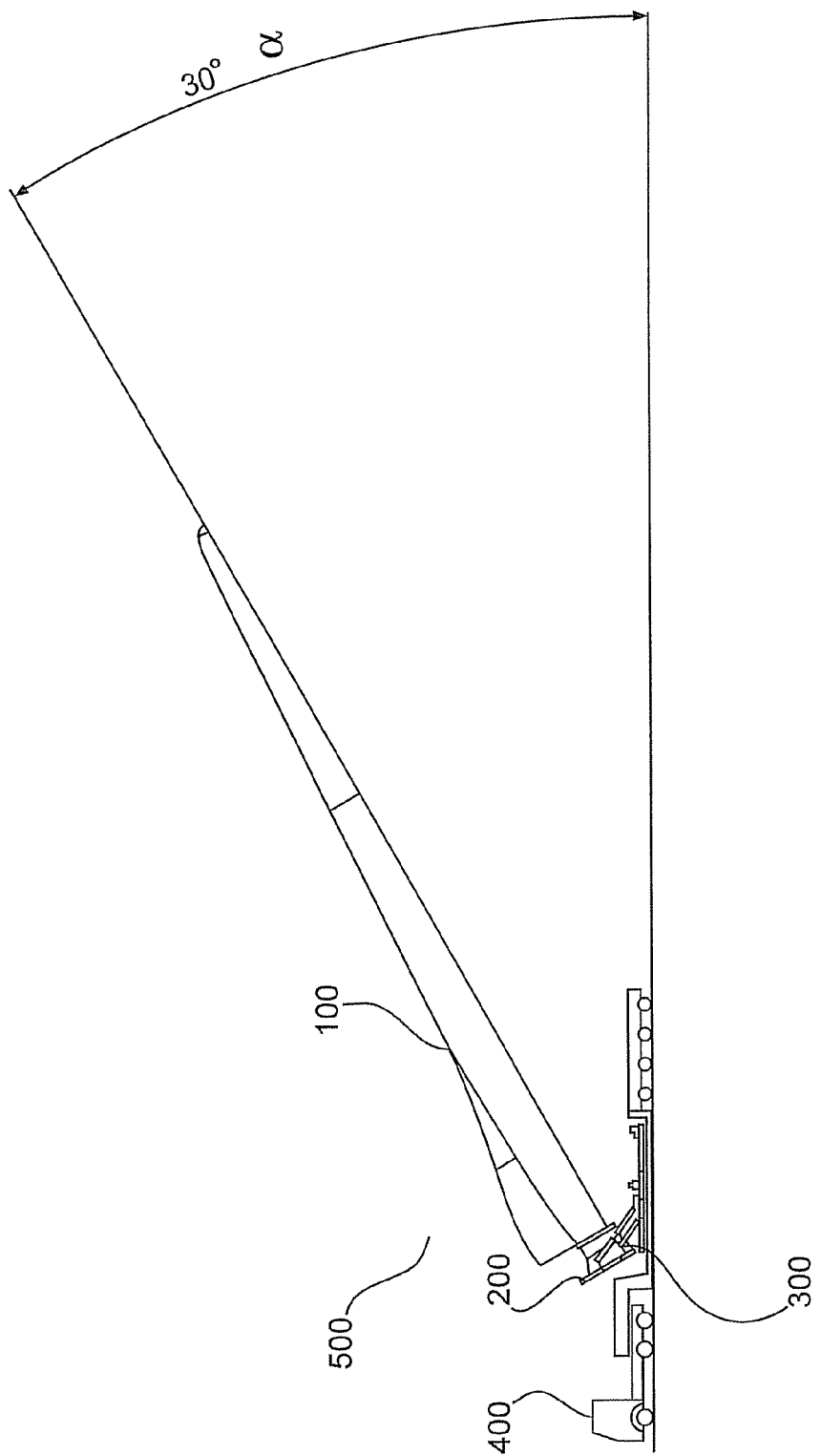

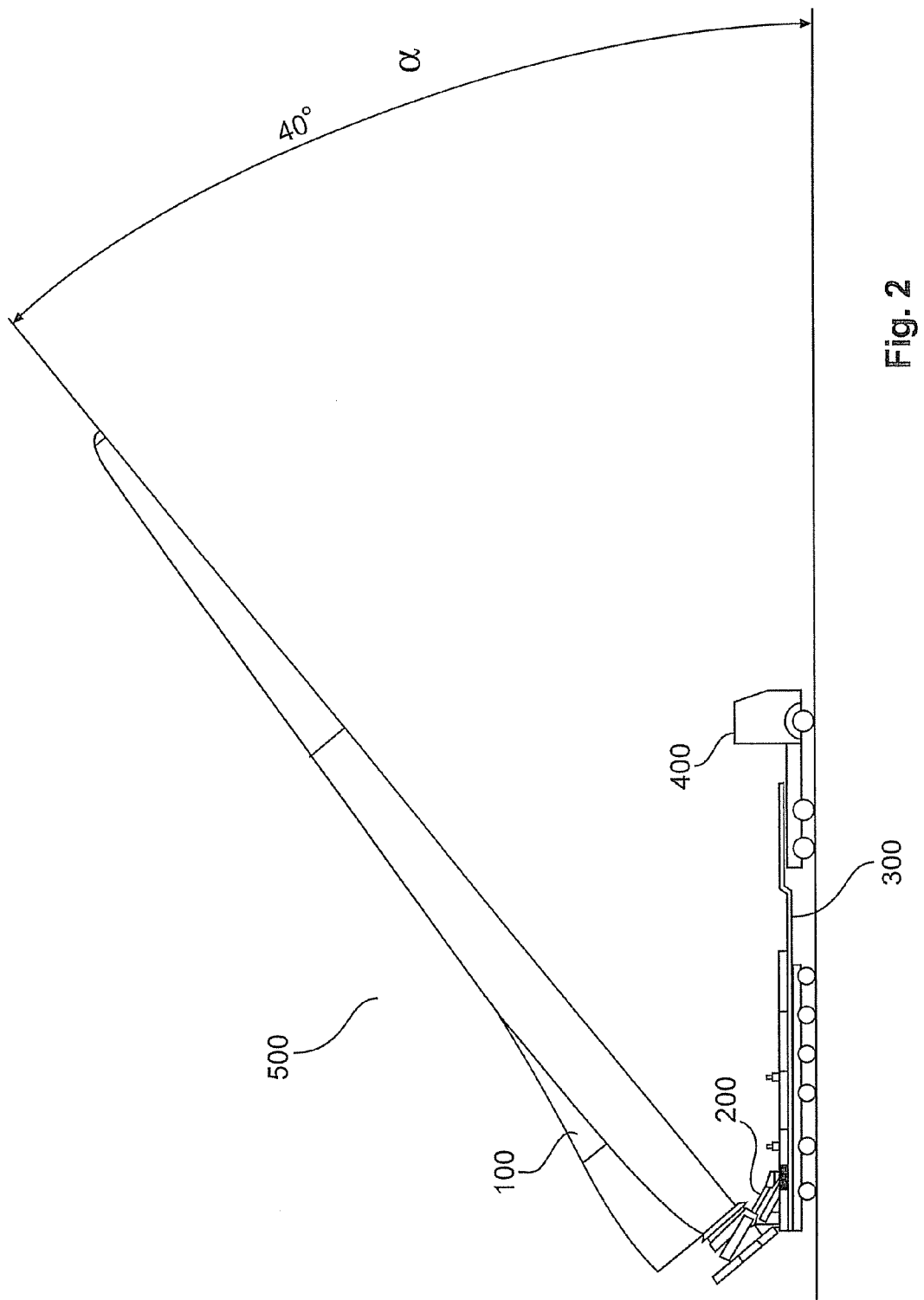

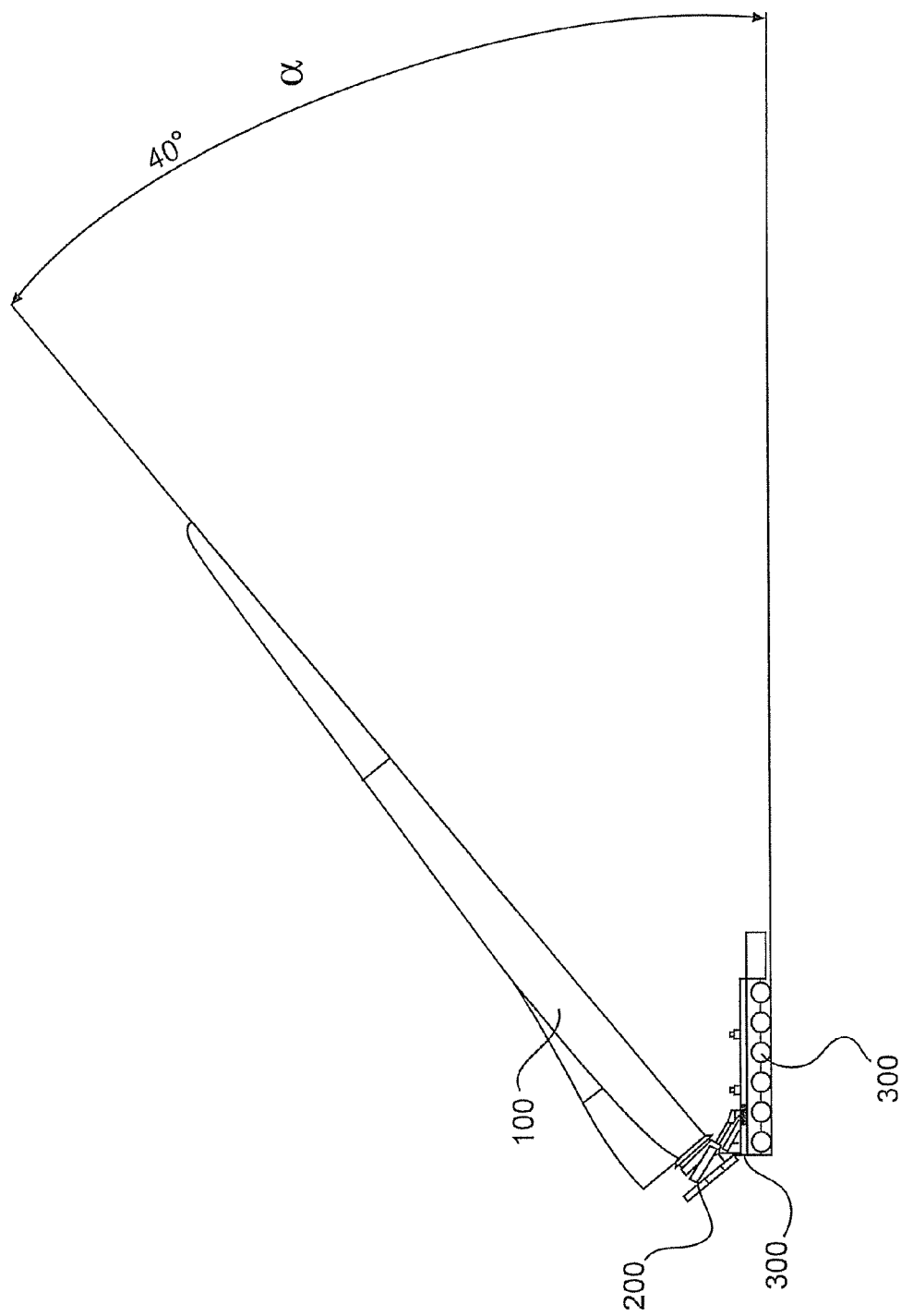

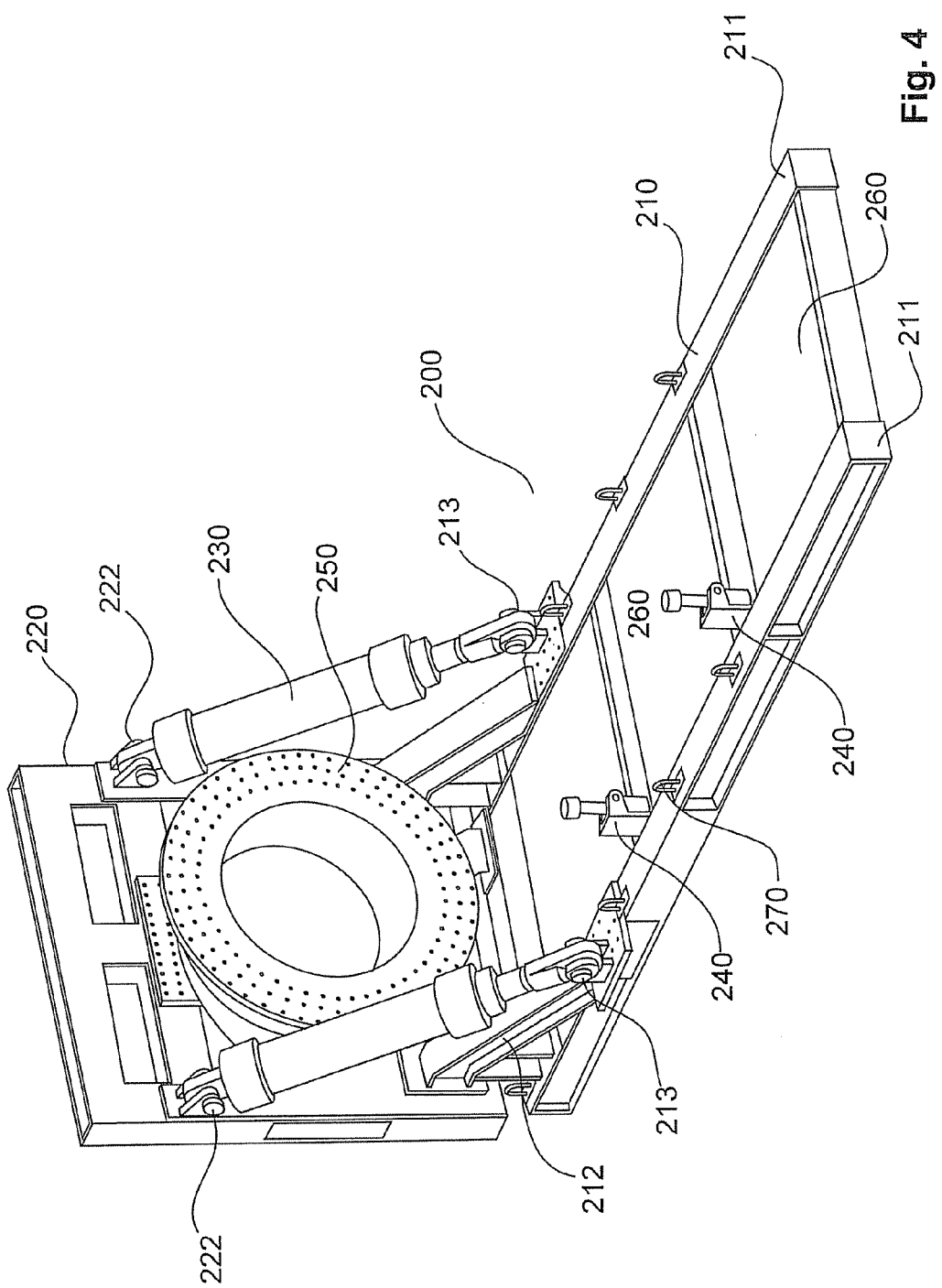

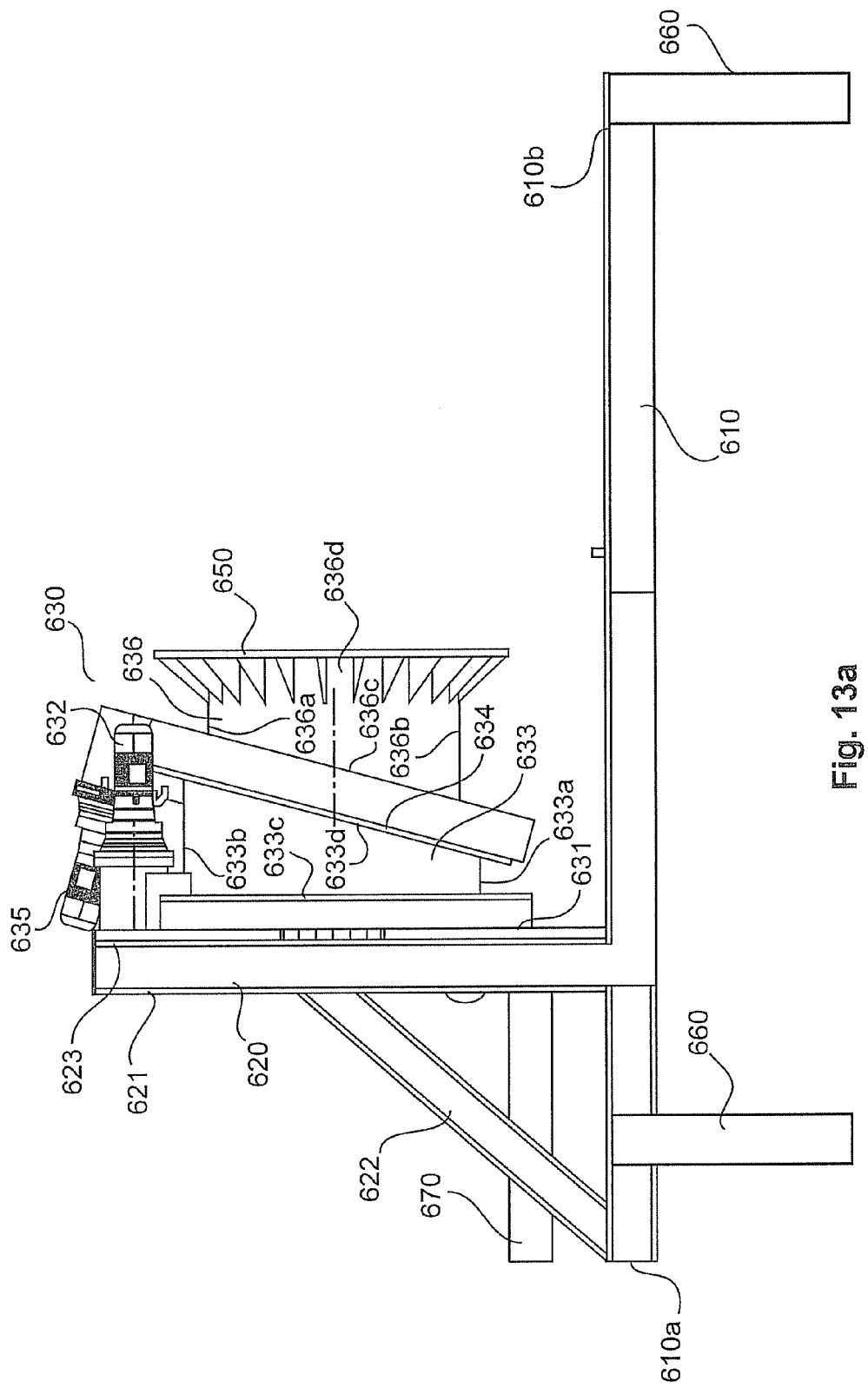

TRANSPORT VEHICLE FOR ROTOR BLADES AND/OR TOWER SEGMENTS OF WIND POWER PLANTS AND TRANSPORT RACK FOR A TRANSPORT VEHICLE

BACKGROUND

1. Technical Field

The present disclosure concerns a transport vehicle, in particular a transport vehicle for wind power installation rotor blades and/or pylon segments and a transport support structure for transport vehicles.

2. Description of the Related Art

WO 03/057528 A1 discloses a transport vehicle for a rotor blade of a wind power installation. The transport vehicle has a tractor and a trailer. The tractor and the trailer are connected together by the rotor blade itself during transport. In that case the rotor blade is mounted rotatably both to the tractor and also to the trailer so as to permit rotation about the longitudinal axis of the rotor blade.

DE 20 2009 012 068 U1 discloses a transport vehicle for rotor blades, wherein the rotor blades are pivotable about a pivot axis.

As further state of the art, attention is directed to DE 199 38 017 A1, WO 2008/104185 A1 and WO 2004/041589 A1.

BRIEF SUMMARY

A transport vehicle is provided, and in particular a transport vehicle for wind power installation rotor blades and/or pylon segments, which permits more flexible transport.

The transport vehicle has a transport support structure having a main frame, a receiving frame fixedly connected to the main frame at a first angle, and a rotary displacement unit which is fixed with one end to the receiving frame and which at its second end has a blade adaptor for receiving a rotor blade or a pylon segment. The main frame spans a main plane. The rotary displacement unit has at least one rotary mounting, wherein there is provided a second angle between the main plane and a first rotary plane of the first rotary mounting.

The specific configuration of the rotary displacement unit (in particular the angle between the first and second rotary planes) provides that, by virtue of a rotation of the first and second rotary mountings, a rotor blade or pylon segment fixed to the blade adaptor can both be rotated about its longitudinal axis and also rotated in such a way that there is an angle between the transport support structure and the rotor blade or the pylon segment respectively. Thus, the angle between the transport support structure and the rotor blade or the pylon segment can be adjusted by rotation of the first and second rotary mountings.

In a further aspect of the present invention, the rotary displacement unit has a second rotary mounting. A first portion is provided between the first and second rotary mountings. A second portion of the rotary displacement unit is provided between the second rotary mounting and the blade adaptor. There is a third angle between the plane of the blade adaptor and the second rotary plane of the second rotary mounting.

In a further aspect of the invention, the first and second portions of the rotary displacement unit each have a first and a second end. In that case the first ends of the first and second portions are shorter than the second ends. By virtue of that configuration of the first and second portions of the rotary displacement unit, which are connected together by way of the second rotary mounting, there can be an adjustment of the angle between the transport support structure and the rotor blade when the first and second rotary mountings are correspondingly rotated.

In a further aspect of the invention, the rotary displacement unit has a second rotary mounting, wherein there is a first portion between the first and second rotary mountings and wherein there is a second portion between the first rotary mounting and the blade adaptor. There is a third angle between the plane of the receiving frame and the first rotary plane of the first rotary mounting.

In a further aspect of the invention, in a first operating condition the first rotary mounting is set in such a way that the first end of the first portion faces downwardly and the second rotary mounting is set in such a way that its second end points downwardly. Thus in the first operating condition the plane of the blade adaptor is substantially parallel to the plane of the first rotary mounting. Thus, the angle between the rotor blade and the transport support structure in the first operating condition is substantially zero. In a second operating condition the first rotary mounting is so set that the second end of the first portion points downwardly and the second rotary mounting is so set that its second end points downwardly. In such a position, there is an angle between the first rotary plane and the plane of the blade adaptor. Thus, there is also an angle between the rotor blade and the transport support structure, which is greater than zero.

Embodiments of the invention also concern a transport vehicle for transporting wind power installation rotor blades and pylon segments. The transport vehicle has a transport support structure having a main frame and a tilting cradle pivotably connected to the main frame. The tilting cradle has a first and a second side. The transport vehicle further has at least one hydraulic cylinder or other variable-length pulling/pushing bar between the main frame and the first side of the tilting cradle. There is also a blade adaptor for receiving a wind power installation rotor blade or a pylon segment. The rotor blade is arranged at the first or the second side of the tilting cradle.

In an aspect of the invention, the main frame at one side has at least one lifting unit for lifting or tilting the main frame.

In a further aspect of the invention, the main frame has two abutment blocks which limit a pivotal movement of the tilting cradle at least in one direction.

In a further aspect of the invention, the blade adaptor is arranged on the second side of the tilting cradle.

In a further aspect of the invention, the transport vehicle has a trailer on which the transport support structure is fixed. The first side of the tilting cradle is provided in the direction of travel or in opposite relationship to the direction of travel.

In a further aspect of the invention, the blade adaptor is provided on the second side of the tilting cradle. The at least one hydraulic cylinder is arranged on the first side of the tilting cradle. The hydraulic cylinder applies a tensile force for the pivotal movement of the tilting cradle.

Embodiments of the present invention also concern a transport support structure for transporting a wind power installation rotor blade or a pylon segment. The transport support structure has a main frame, a tilting cradle pivotably connected to the main frame, at least one hydraulic cylinder connected to the main frame and the first side of the tilting cradle, and a blade adaptor for receiving the wind power installation rotor blade or the pylon segment, which is provided at the first or the second side of the tilting cradle.

Embodiments of the invention also concern the idea of providing a transport vehicle having a transport support structure which allows a pivotal movement so that the rotor blade is tilted or is inclined or is to be inclined through an angle α.

In that case, the transport support structure can optionally be arranged both in the front region of the transport vehicle or in the rear region. If the transport support structure is arranged in the front region, then the rotor blade will project rearwardly beyond the transport vehicle. If however the transport support structure is arranged in the rear region of the transport vehicle, then the rotor blade will project forwardly beyond the transport vehicle. Optionally the pivotal movement of the transport support structure can be effected by hydraulic cylinders. The hydraulic cylinders can be loaded either in respect of compression or also tension.

Optionally the transport support structure can be provided on the transport vehicle or a trailer of the transport vehicle on one side with at least one hydraulic cylinder to permit easy tilting of the transport support structure. That is advantageous so that the hole array in a flange for receiving the rotor blade coincides with the flange of the rotor blade and the rotor blade can be mounted in place. That however can also be achieved by the use of a rotary drive (for the blade adaptor) for rotation about the longitudinal axis of the rotor blade.

BRIEF DESCRIPTION OF THE SEVERAL VIEWS OF THE DRAWINGS

Advantages and embodiments by way of example of the invention are described in greater detail hereinafter with reference to the drawings.

FIG. 1 shows a diagrammatic view of a transport vehicle in accordance with one embodiment.

FIG. 2 shows a diagrammatic view of a transport vehicle in accordance with another embodiment.

FIG. 3 shows a diagrammatic view of a transport vehicle in accordance with another embodiment.

FIG. 4 shows a perspective view of an adaptor unit in accordance with one embodiment.

FIGS. 13A-13C show various views of a transport support structure in accordance with one embodiment.

DETAILED DESCRIPTION

Figure 5A:
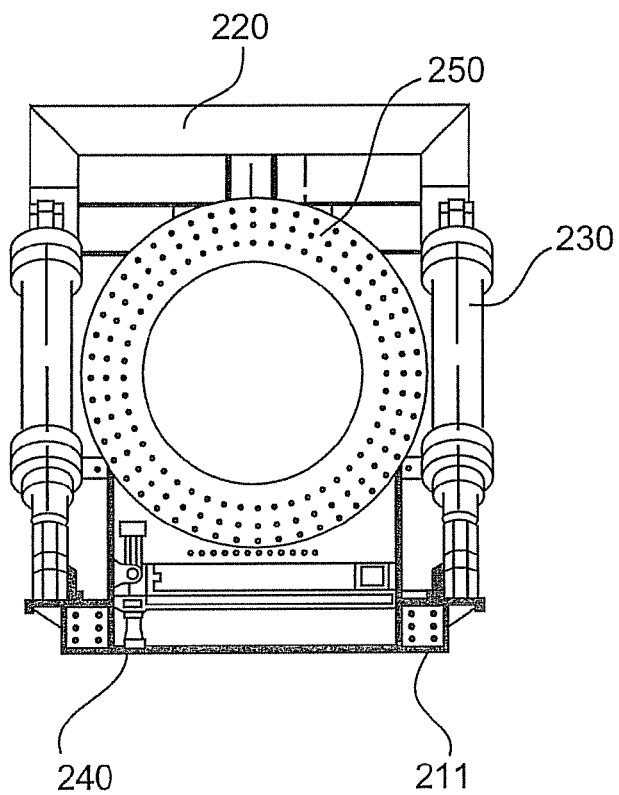
FIG. 5A shows a plan view of an adaptor unit.

FIG. 1 shows a diagrammatic view of a transport vehicle in accordance with one embodiment. The transport vehicle comprises for example a truck 400 and for example a (semi-)trailer 300. Fixed on the (semi-)trailer is a transport support structure 200 serving to receive a rotor blade 100 or a pylon segment. The rotor blade 100 can also be tilted by pivotal movement or tilting of a part of the transport support structure.

FIG. 2 shows a diagrammatic view of a transport vehicle in accordance with another embodiment. The transport vehicle has a truck 400 and for example a semi-trailer. A transport support structure 200 is fixed on the semi-trailer. A part of the support structure is pivotable and serves to receive a rotor blade 100.

In the structure shown in FIG. 1 the tip of the rotor blade 100 projects rearwardly beyond the transport vehicle. In the structure shown in FIG. 2 the tip of the rotor blade 100 projects forwardly beyond the truck 400.

The structure 200 shown in FIG. 1 permits pivotal movement or tilting of the rotor blade through the angle α, for example 30°. The transport support structure 200 shown in FIG. 2 permits tilting of the rotor blade through α, for example, up to 40°.

FIG. 3 shows a diagrammatic view of a transport vehicle system in accordance with yet another embodiment. While the transport system in the aforementioned embodiments each has a truck 400, the transport system in the example embodiment of FIG. 3 is implemented without a truck and can represent a self-propelled vehicle. The transport system thus has a semi-trailer 300 and a pivotable transport support structure 200. In that case, the rotor blade 100 is mounted in the pivotable part of the transport support structure 200.

FIG. 4 shows a perspective view of a transport support structure 200 in accordance with one embodiment. The transport support structure 200 has a first portion or a main frame 210 and a second portion or a tilting cradle 220, wherein the second portion 220 is connected pivotably or rotatably to the first portion 210. Hydraulic cylinders 230 can be provided between the first and second portions 210, 220. Pivotal movement of the second part or the tilting cradle 220 can be permitted by means of those hydraulic cylinders 230.

The main frame 210 has two substantially parallel struts or main bearers 211 which can serve to receive weights 260. A plurality of hydraulic cylinders 240 are optionally provided at one side of the main frame 210. Those hydraulic cylinders make it possible to implement tilting of the entire transport support structure 200. That is advantageous in order to bring the hole array of the holes in the rotor blade root region into conformity with the holes in a blade adaptor 250 fixed to the second portion 220.

Eyes 270 can be provided for transporting the transport support structure 200.

The hydraulic cylinders 230 can be fixed at a first fixing point 213 on the first portion 210 and a second fixing point 220 on the second portion 220 of the transport support structure 200. The angle between the main frame 210 and the tilting cradle 210 can be varied by extending and retracting the hydraulic cylinders 230.

Figure 5B:
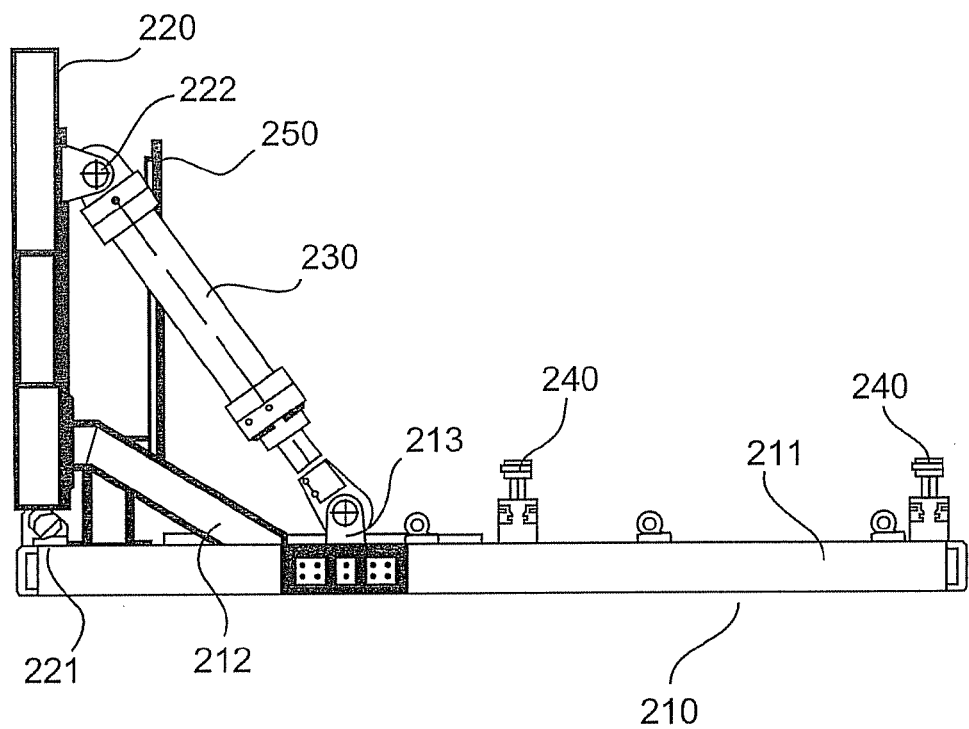
FIG. 5B shows a side view of an adaptor unit in accordance with another embodiment.

FIG. 5A shows a plan view and FIG. 5B shows a side view of a transport support structure in accordance with another embodiment. The transport support structure 200 has first and second portions (main frame, tilting cradle) 210, 220 which are respectively connected together pivotably or rotatably by way of a pivot mounting 221. The first portion (main frame) 210 has a plurality of hydraulic cylinders 240 which are used for tilting the transport support structure when mounting the rotor blade in place. The two hydraulic cylinders 230 are provided at the mounting 213 on the first portion 210 and the mounting 222 on the second portion 220.

Figure 6:
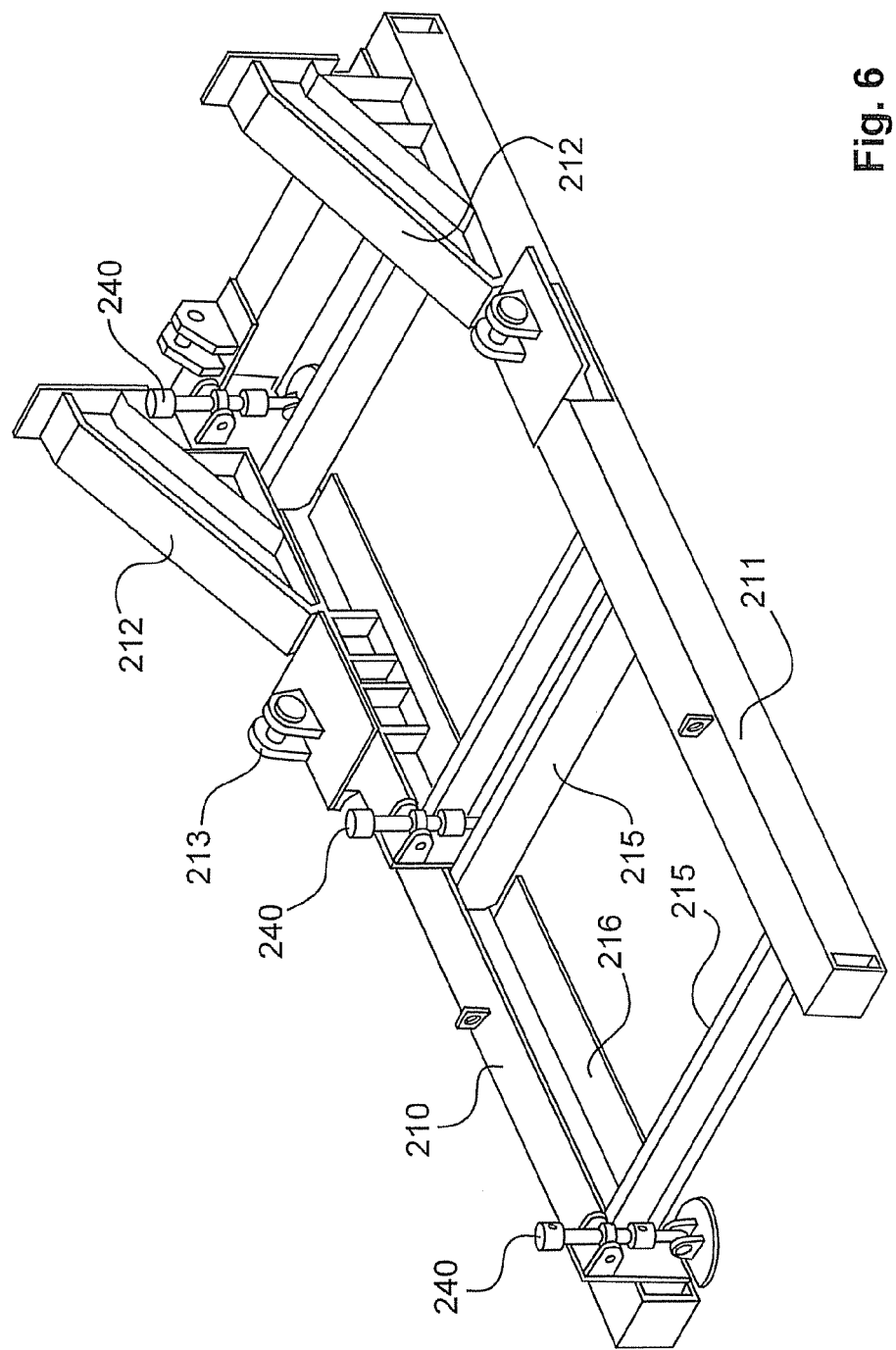
FIG. 6 shows a perspective view of a main frame of a transport support structure in accordance with one embodiment.

FIG. 6 shows a perspective view of a main frame of a transport support structure in accordance with one embodiment. The main frame 210 can be made up, for example, from IPB profile bearers. In that case the frame 210 has two main bearers 211 and a plurality of transverse bearers 215. The main frame 210 also has two abutment blocks 212. The abutment blocks 212 serve to provide that, in the event of a drop in the hydraulic pressure in the hydraulic cylinders (not shown), the rotor blade can only sink to a defined point. Mountings 213 are provided for receiving the hydraulic cylinders (not shown). The hydraulic cylinders 240 serve to produce a slight tilting movement of the main frame 210 so that a rotor blade can be better mounted in place on the transport support structure.

Figure 7:
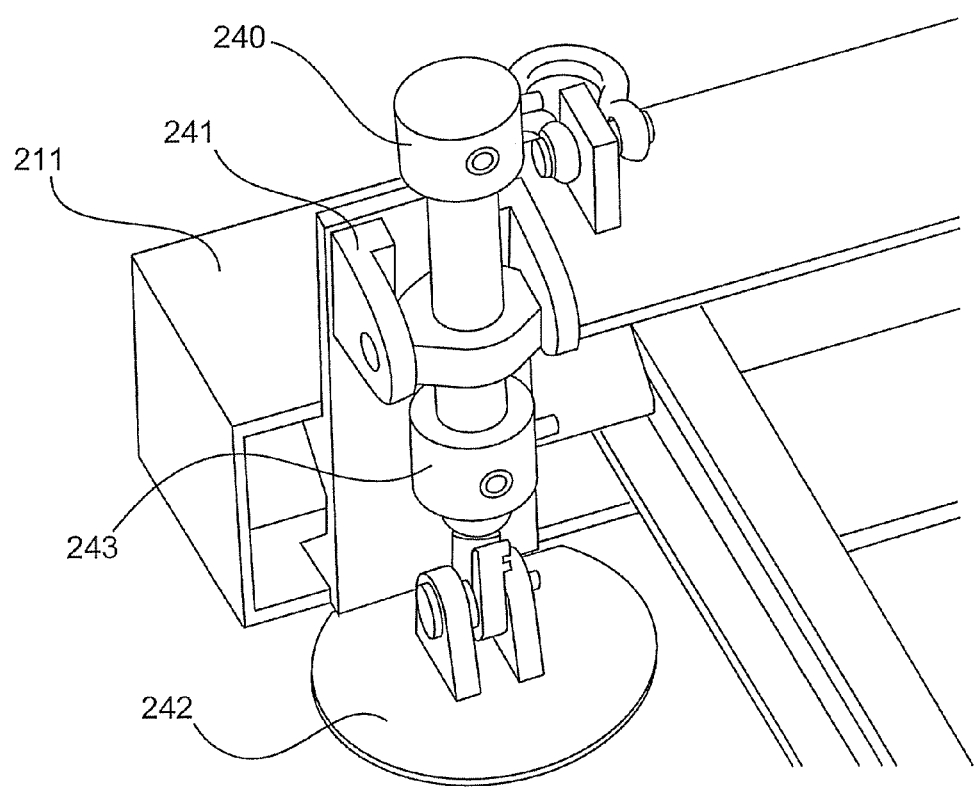
FIG. 7 shows a hydraulic unit for an adaptor unit in accordance with one embodiment.

FIG. 7 shows a perspective view of a lifting device of a transport support structure in accordance with one embodiment. The lifting device 240 is connected to the main bearers 211 and can rest by means of a foot 242 for example on a semi-trailer and can provide for tilting of the main frame. The lifting device is particularly suited to tilting the transport support structure through up to 10° with respect to the transport vehicle.

Figure 8:
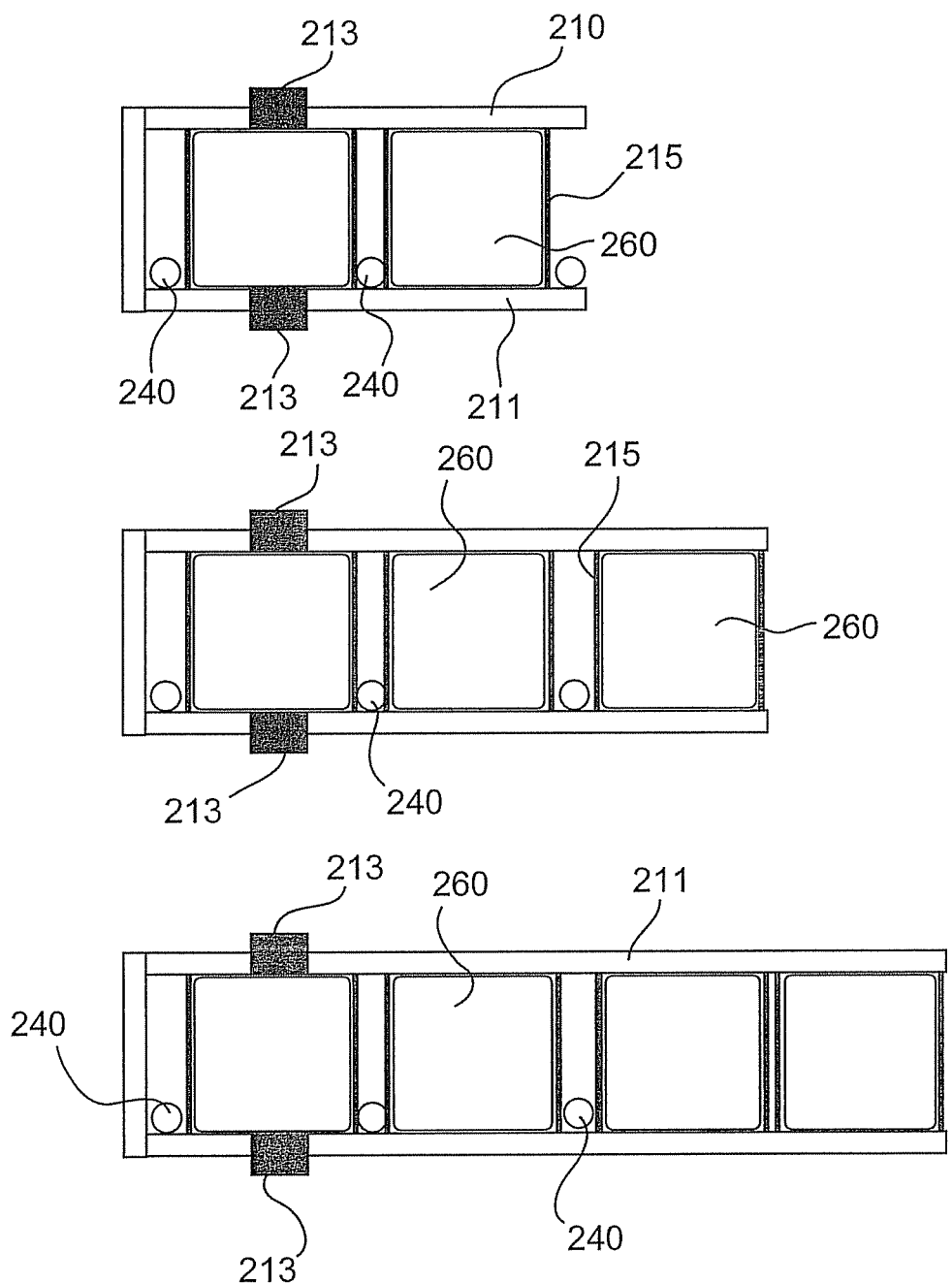
FIG. 8 shows various configurations of an adaptor unit in accordance with various embodiments.

FIG. 8 shows a diagrammatic view of a transport support structure in accordance with various embodiments. In this case, the transport support structure is in particular of a modular configuration so that various modules can be fixed to a main frame and the transport support structure can thus be varied in its length. That means that the transport support structure can be adapted to the respective load dimension of the transport vehicle. Weights 260 can be provided to increase the safeguard against tilting. The upper image of FIG. 8 shows a main support structure for a semi-trailer with low-loading bed. The middle image of FIG. 8 shows a main support structure and an extension. The lower image of FIG. 8 shows two main support structures and two extensions. The transport support structure can be adapted to any desired type of vehicle by virtue of the modular structure of the transport support structure.

Figure 9:
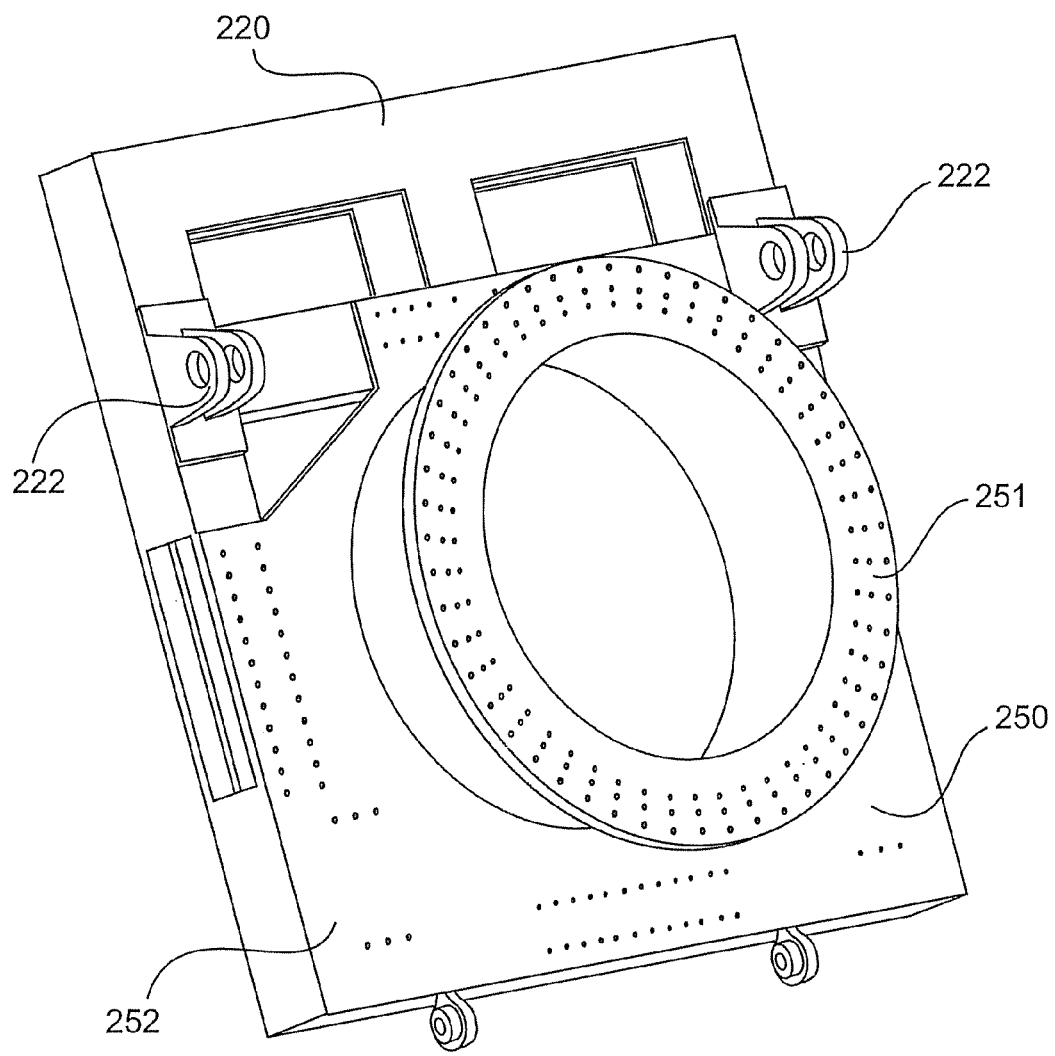
FIG. 9 shows a perspective view of a part of an adaptor unit in accordance with one embodiment.

FIG. 9 shows a perspective view of a tilting cradle of a transport support structure in accordance with one embodiment. In this case, the tilting cradle 220 can correspond to the second portion in accordance with one of the previous described embodiments. In this case, the tilting cradle 220 is preferably pivotably fixed to the first portion (main frame) of the transport support structure. The tilting cradle 220 can be produced for example from a frame consisting of IPB profile bearers. The tilting cradle 220 can have an adaptor 251 having a multiplicity of holes arranged in a circular shape, in which case the diameter of the circles can be different. There can also be different circles of holes per se. In that way, different rotor blades of different diameters can also be fixed to the adaptor 251.

Figure 10:
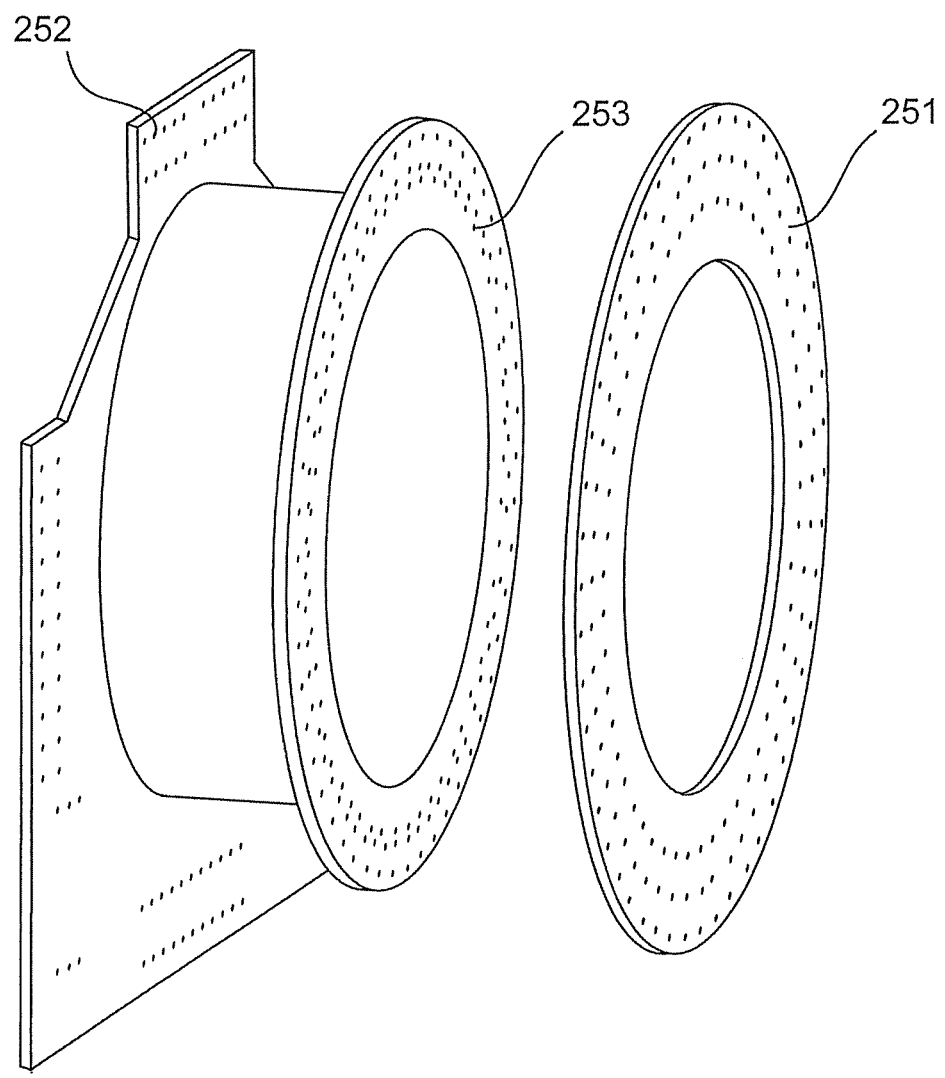
FIG. 10 shows a perspective view of a part of an adaptor unit in accordance with one embodiment.

FIG. 10 shows a perspective view of the blade adaptor and an adaptor plate for a transport support structure in accordance with one embodiment. In this case, the transport support structure in accordance with this embodiment can correspond in particular to the transport support structure in accordance with the embodiment shown in FIG. 9. As an alternative thereto, however, the transport support structure in accordance with this embodiment can also correspond to one of the transport support structures of the other embodiments described above. A multiplicity of rotor blades of differing diameter can be mounted at the rotor blade root region by the provision of the adaptor plate 251.

Figure 11:
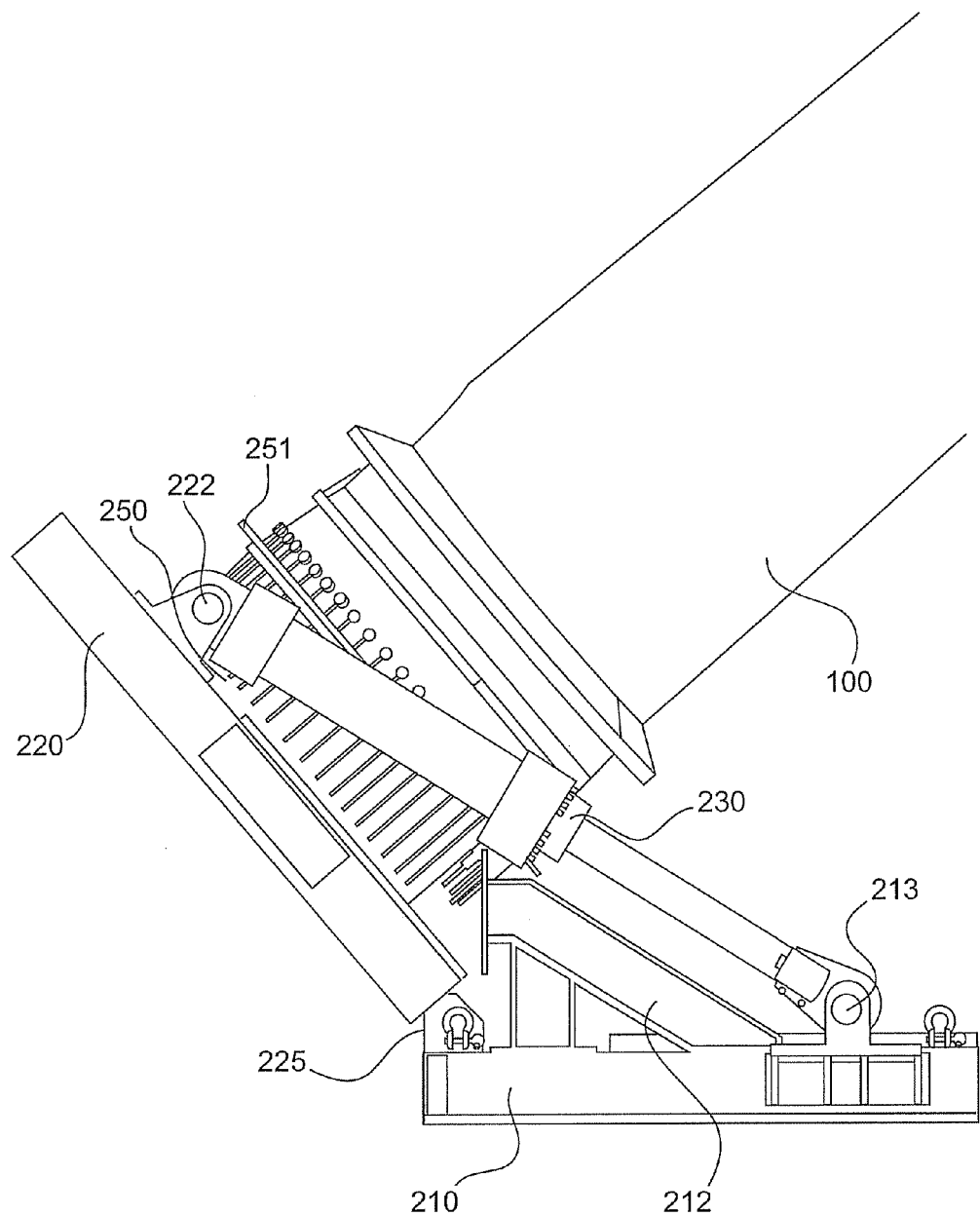
FIG. 11 shows a side view of a part of an adaptor unit in accordance with one embodiment.

FIG. 11 shows a diagrammatic plan view of a portion of an adaptor unit in accordance with one embodiment. In this case, the adaptor unit can be based on a transport support structure in accordance with one of the aforementioned embodiments. A tilting cradle 220 is connected to a main frame 210 by way of a pivot mounting 225. The main frame 210 has two abutment blocks 212. A hydraulic cylinder 230 is fixed at a first mounting 213 on the main frame 210 and a second mounting 222 on the tilting cradle 220. A rotor blade 100 is fixed to the adaptor plate 251. The tilting cradle 220 can be pivoted by extension or retraction of the hydraulic cylinder 230. The large lever arm and the weight of the rotor blade afford a high rotary moment at the point of rotation of the tilting cradle 220. Preferably two cylinders 230 are arranged in parallel mutually juxtaposed relationship to ensure uniform pivotal movement of the tilting cradle 220. In that case, the hydraulic cylinders 230 are provided in such a way that they do not come into contact with the rotor blade in the pivotal movement. Optionally the cylinders 230 can be so designed that even one of the cylinders could hold the rotor blade if the other cylinder fails.

If a transport vehicle has a hydraulic chassis arrangement then even inclined carriageway surfaces can thus be compensated. Weights 260 can be provided on or at the main frame to further increase the stability of the transport vehicle.

Figure 12:
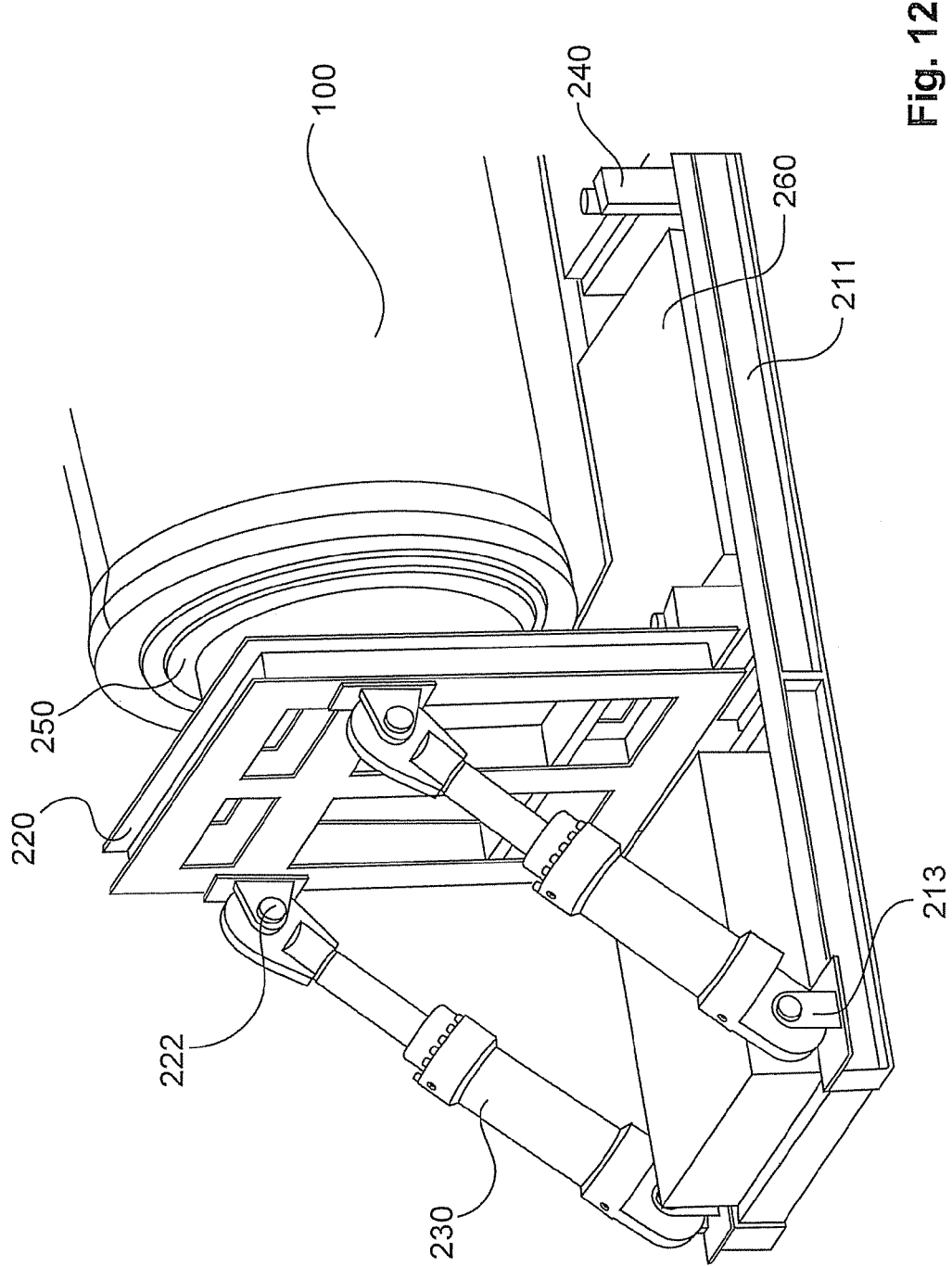
FIG. 12 shows a perspective view of a transport support structure in accordance with one embodiment.

FIG. 12 shows a perspective view of a transport support structure in accordance with one embodiment. As in the aforementioned embodiments, the transport support structure has a main bearer 211 and a tilting cradle 220. While however in the aforementioned embodiments, the tilting cradle is fixed at one end of the main bearer, the tilting cradle in the embodiment shown in FIG. 12 is not fixed at the end, but the mountings 213 for the hydraulic cylinders 230 are fixed at one end of the main frame 210. While the hydraulic cylinders 230 in the aforementioned embodiments are in the form of pushing hydraulic cylinders, the hydraulic cylinders 230 in the embodiment shown in FIG. 12 are in the form of pulling hydraulic cylinders. The configuration of the transport support structure in the embodiment shown in FIG. 12 is particularly advantageous for large rotor blades because the blade adaptor 250 is not provided on the same side as the hydraulic cylinders 230 but on the opposite side. In that way the blade adaptor can be larger. The configuration of the transport support structure in the embodiment shown in FIG. 12 is advantageous because it is possible in that way to observe a transport width of 3 m and nonetheless there is sufficient space for receiving flanges of larger rotor blades. Accordingly the hydraulic cylinders 230 are positioned behind the tilting cradle 220. Thus the hydraulic cylinders 230 must produce a pulling force instead of a pushing force.

In a further embodiment, which can be based on one of the aforementioned embodiments, the blade adaptor 250 can be adapted to be rotatable so that a rotor blade 100 can be rotated about its longitudinal axis for a short time for example for negotiating a bridge. The result of this can be that the transport width is then greater than 3 m. As however that only happens temporarily for example to go under bridges, that does not represent a major problem.

In a further embodiment, the tilting cradle can be fixed rotatably on the main frame. That makes it possible to provide further more flexible options for rotating the rotor blade.

In accordance with some embodiments of the present invention, the rotor blade 100 can be tilted through up to 40°.

The transport support structure 200 according to embodiments of the present invention can be used in relation to all standard truck units.

The adaptor unit according to embodiments of the present invention and the transport support structure according to embodiments of the present invention provide that rotor blades of a wind power installation or pylon segments can be transported even through very tight curves as tilting of the tilting cradle means that an entire rotor blade fixed thereto is pivoted upwardly and there is thus no impediment in passing through a tight curve.

Figure 13B:
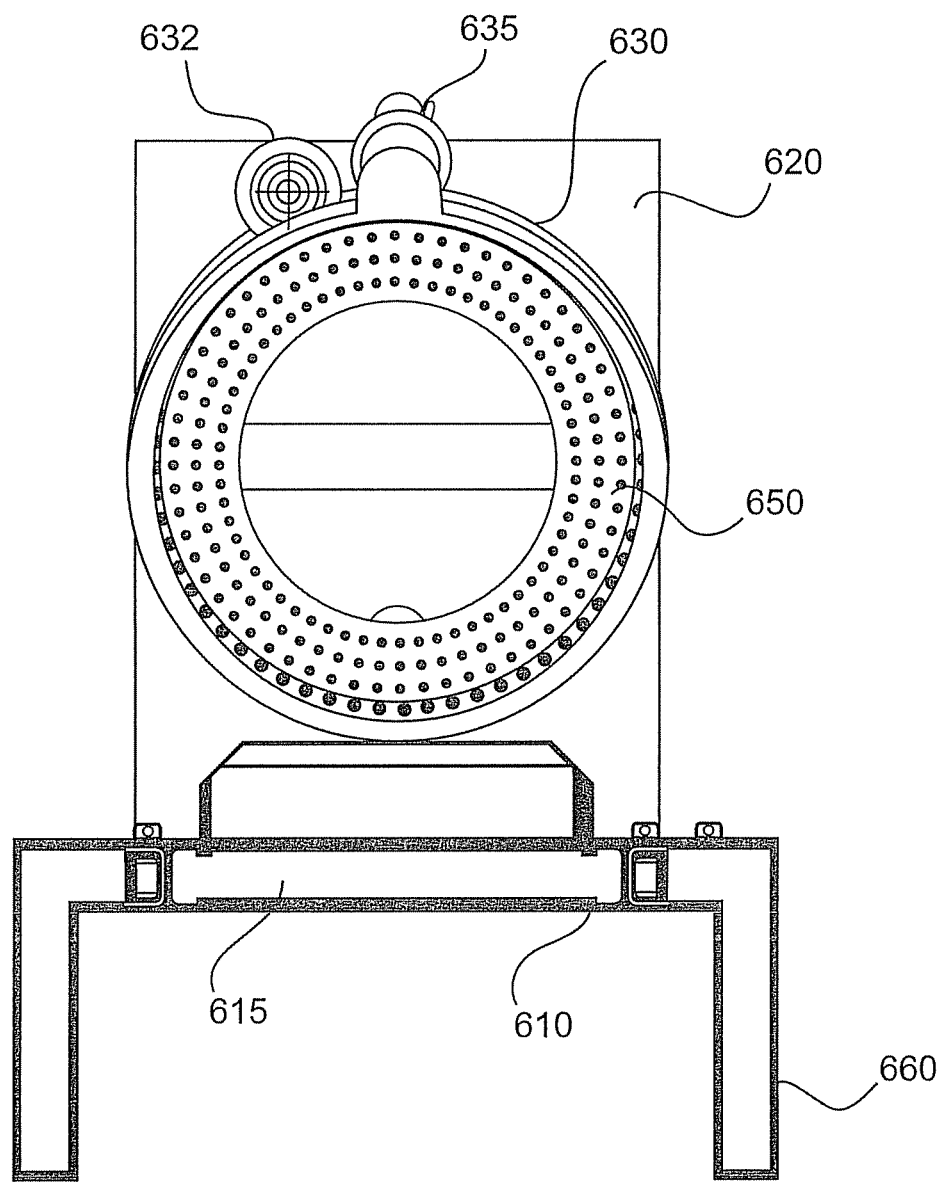
Figure 13C:
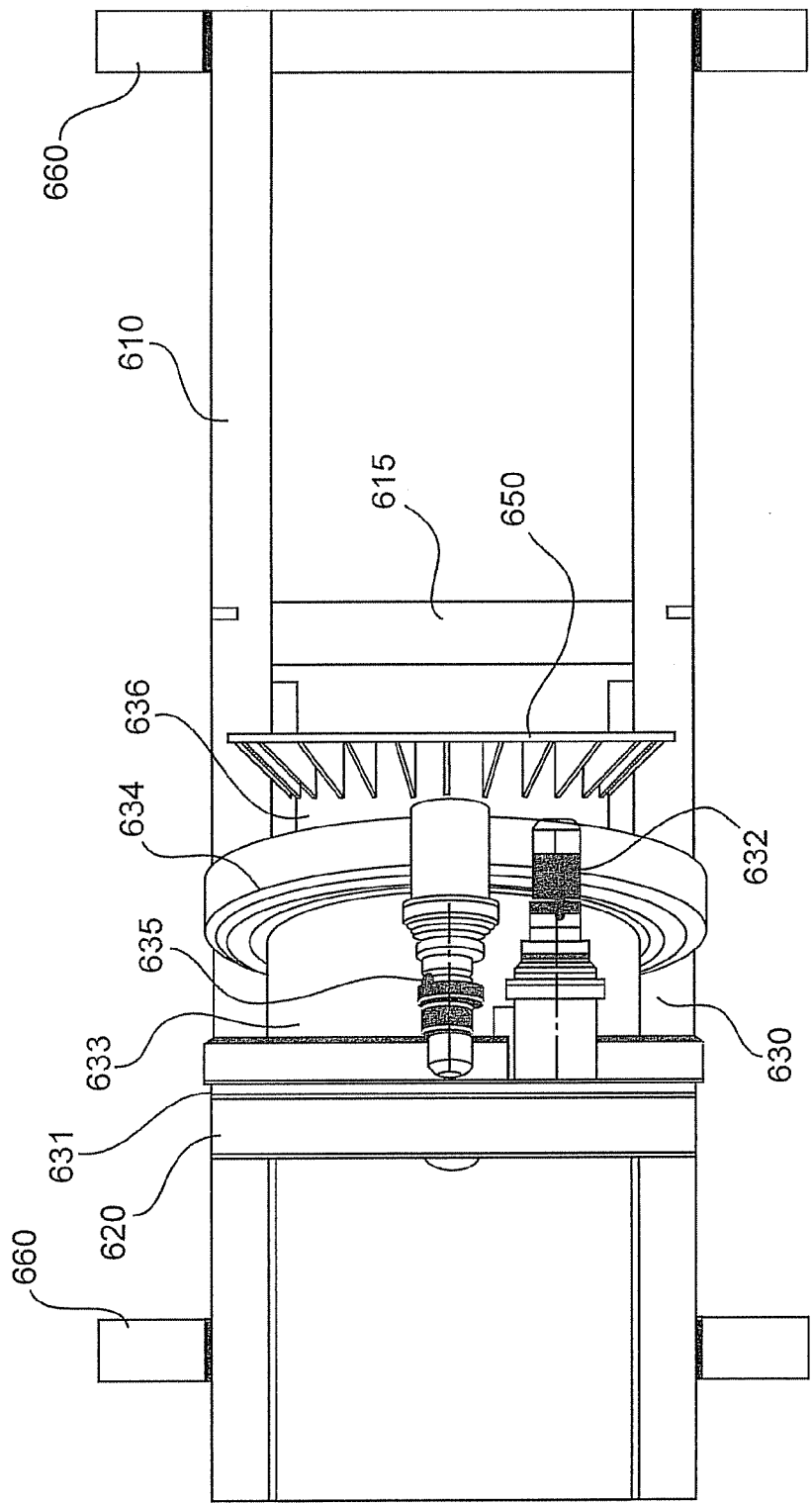

FIGS. 13A to 13C each show various views of a transport support structure in accordance with yet another embodiment. FIG. 13A shows a side view of the transport support structure. FIG. 13B shows a front view of the transport system while FIG. 13C shows a plan view of the transport support structure.

The transport support structure of the embodiment shown in FIGS. 13A to 13C has a main frame 610 optionally with support legs 660 for setting down the support structure and also as support means while traveling. The main frame 610 has a first end 610a and a second end 610b. A receiving frame 620 for receiving a rotary displacement unit 630 is provided in the region of the first end 610. The receiving frame 620 can be connected by struts 622 to the first end 610 of the main frame to increase the stability of the receiving frame. Optionally compensating weights 670 can be provided in or at the first end 610a of the main frame 610.

The receiving frame 620 is preferably designed to be at a right angle to the main frame 610. As an alternative thereto the receiving frame 620 may also be at a different angle in relation to the main frame 610. The receiving frame 620 has a first side 621 and a second side 623. The first side 621 is directed to the first end 610a of the main frame 610. The second side 623 is directed to the second end 610b of the main frame 610. The struts 622 can be fixed at the first side 621 of the receiving frame 620. A rotary displacement unit 630 can be provided at the second side 623 of the receiving frame 620. The rotary displacement unit 630 serves to receive a rotor blade of a wind power installation and to adjust the orientation of the rotor blade, for example the rotor blade can be rotated along its longitudinal axis and/or the rotor blade can be moved to the side or upwardly.

In contrast to the state of the art, and in contrast to the aforementioned embodiments shown in FIGS. 1 through 12, however, the movement of the rotor blade for example upwardly is not effected by way of a pivotal movement or tilting of the rotor blade which is fixed to a tilting cradle.

The rotary displacement unit 630 is fixed by way of its first end 631 at the second end 623 of the receiving frame 620. Provided at the first end 630a of the rotary displacement unit 630 is a first rotary mounting 631 provided for example parallel to the plane of the receiving frame 620. (As an alternative thereto the plane of the rotary mounting may also be at an angle to the plane of the receiving frame 620).

The first rotary mounting 631 can be rotated by a first drive 632 (for example an electric motor) about the axis of the first rotary mounting 631. A first portion 633 of the rotary displacement unit 630 is provided at the rotary mounting 631. The first portion 633 is coupled with its first end to the rotary mounting 631. The first portion 633 further has a first end 633a and a second end 633b. In that case the length of the first end 633a is less than the length of the second end 633b so that the second side 633d is not parallel to the rotary plane of the first rotary mounting 631. In particular the angle between the rotary plane of the first rotary mounting 631 and the second side 633d is between 5° and 25° or between 10° and 50°, such as, for example, between 30° and 40°.

Provided at the second side 633d of the first portion 633 is a first rotary mounting 634 having a second rotary plane and a second rotary axis. A second portion 636 of the rotary displacement unit 630 is provided at the second rotary mounting 634. In that case, a first side 636c is provided at the second rotary mounting 634. A second side 636d of the second portion 636 serves to receive a blade adaptor 650 to which various rotor blades for wind power installations can be fixed.

Thus the rotary displacement unit 630 has a first and a second rotary mounting 631, 634 which each have a rotary plane and wherein there is an angle of a between the two rotary planes of the first and second rotary mountings 631, 634.

The second portion 636 of the rotary displacement unit 630 has a first end 636a and a second end 636b. In this case the length of the first end 636a is less than the length of the second end 636b. Accordingly there is an angle between a plane of the blade adaptor 650 and the rotary plane of the second rotary mounting. Optionally that angle corresponds to the angle between the rotary plane of the first rotary mounting 631 and the second side 633d of the first portion 633.

The second rotary mounting can be rotated by way of a second drive, such as, for example, an electric motor 635.

In a first operating condition (shown in FIG. 13A) the plane of the blade adaptor 650 is parallel to the first rotary plane of the first rotary mounting 631. In this case, the second end 633b of the first portion 633 is arranged upwardly and the second end 633a is arranged downwardly. In addition, the first end 636a of the second portion 636 is arranged upwardly and the second end 636b is arranged downwardly. In this case, downwardly means the side towards the main bearer and upwardly means the side remote from the main bearer. In the first operating condition, the plane of the blade adaptor 650 is thus substantially parallel to the first rotary plane of the first rotary mounting 631.

In a second operating condition, the first portion 633 is rotated through 180° so that the second end 633b faces downwardly and the first end 633a faces upwardly. In that second operating condition, therefore the second ends of the first and second portions 633, 636 thus respectively face downwardly and the two first ends 633a and 636a face upwardly. In the second operating condition, the plane of the blade adaptor 650 is inclined through the first angle α1 relative to the rotary plane of the first rotary mounting 631. In that case, a rotor blade fixed to the blade adaptor 650 extends at an angle to the main frame 610.

It will be appreciated that further operating conditions are possible between the first and second operating conditions. For example, the rotor blade can be rotated about its longitudinal axis by means of the first rotary mounting 631. That may be necessary, for example, if the rotor blade is to be transported under a bridge. In such a case, the rotor blade can be so rotated that it fits through the bridge. It can then be rotated back again so that it is again below the maximum transport width.

FIG. 13B shows a view of the transport support structure in accordance with the embodiment shown in FIG. 13A. The transport support structure has a main frame 610 with support legs 660. The main frame 610 further has a receiving frame 620 and a rotary displacement unit 630. The rotary displacement unit 630 has a first and a second drive 632, 635 as well as a blade adaptor 650 for receiving rotor blades.

FIGS. 13C shows a view from above of the transport support structure according to the embodiment shown in FIGS. 13A and 13B. The transport support structure has a main frame 610 with support legs 660. The transport support structure further has a receiving frame 620 for receiving a rotary displacement unit 630. The rotary displacement unit 630 has a first rotary mounting 631 and a second rotary mounting 634. A first portion 633 of the rotary displacement unit 630 is provided between the first and second rotary mountings 631, 634. A second portion 636 of the rotary displacement unit is provided between the second rotary mounting 634 and a blade adaptor 650.

Figure 14:
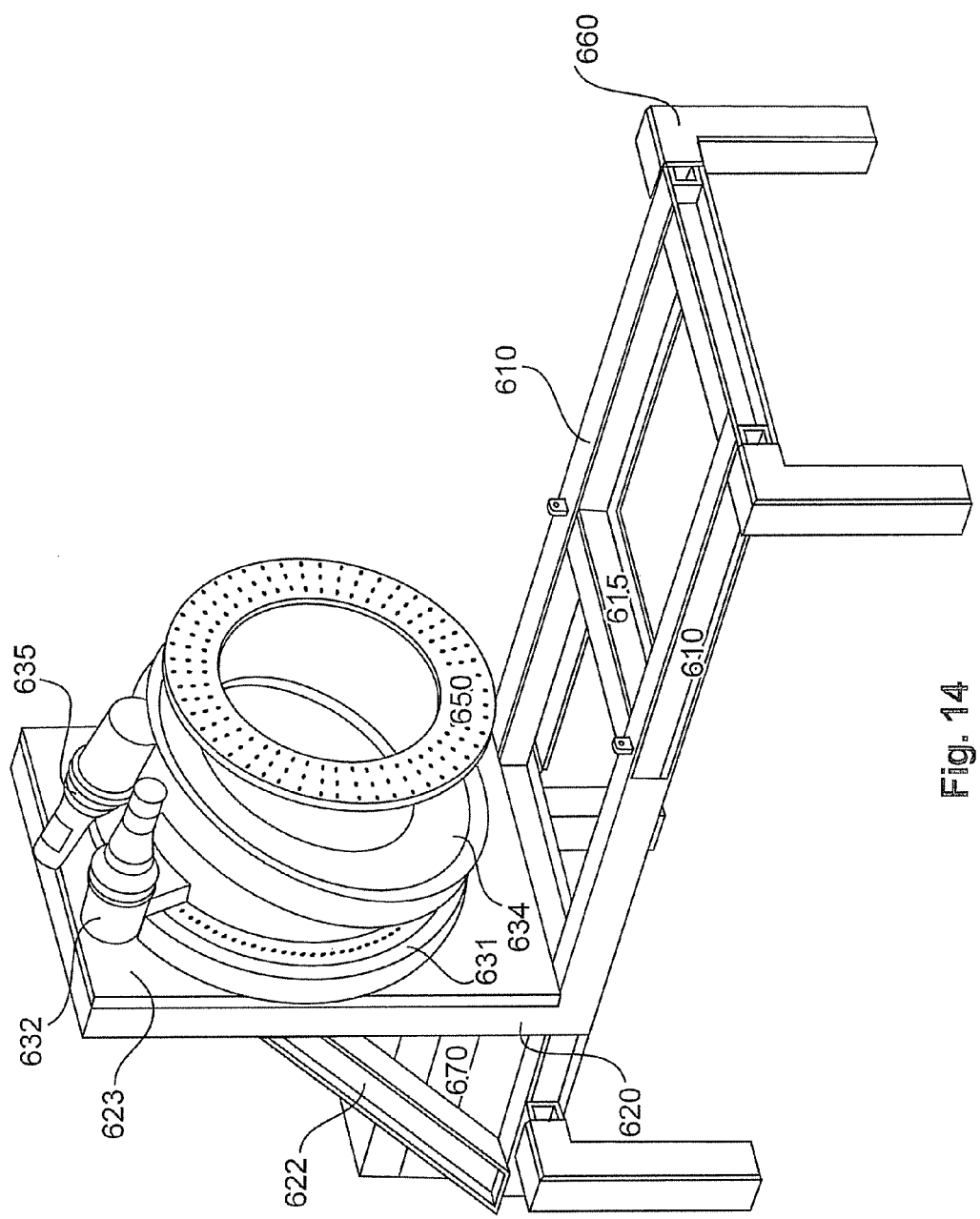
FIG. 14 shows a perspective view of a transport support structure in accordance with one embodiment.

FIG. 14 shows a perspective view of a transport support structure in accordance with one embodiment. The transport support structure in accordance with the embodiment shown in FIG. 14 can be based on the transport support structure of the embodiment shown in FIG. 13. The transport support structure has a main frame 610 with for example four support legs 660 (optional). In addition, there can be transverse struts 615 between the two longitudinal struts of the main frame 610. The main frame 610 also has a receiving frame 620 which is provided for example at an angle of 90° relative to the main frame 610 (another angle is also possible). The transport support structure can further optionally have a plurality of compensating weights 670. In addition, the transport support structure has a rotary displacement unit 630. The rotary displacement unit 630 has a first rotary mounting 631 having a first axis of rotation and a first rotary plane and a second rotary mounting 634 having a second rotary plane and a second rotary axis. The first rotary mounting 631 can be displaced or rotated by way of a first drive 632 (for example an electric motor). The second rotary mounting 634 can be rotated by way of a second drive 635 (for example an electric motor). A first portion 633 of the displacement unit is provided between the first and second rotary mountings 631, 634. A second portion 636 is provided between the second rotary mounting 634 and the blade adaptor 650.

Figure 15:
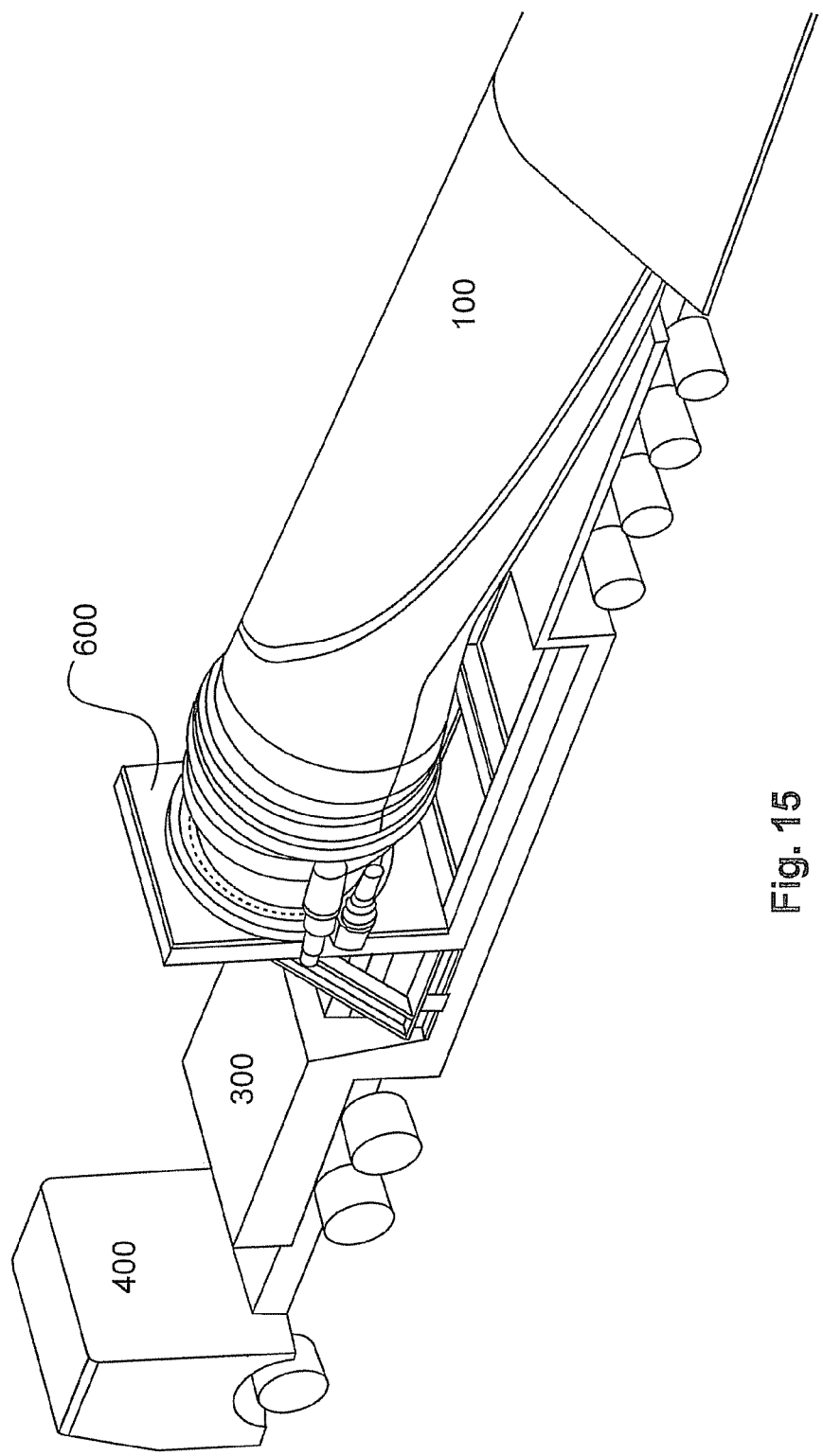
FIG. 15 shows a perspective view of a transport system in accordance with one embodiment with a rotor blade of a wind power installation.

FIG. 15 shows a perspective view of a transporter having a transport support structure 600 in accordance with another embodiment and a rotor blade 100. A truck 400 pulls a trailer 300 on which the transport support structure 600 is provided. A rotor blade 100 is fixed on the transport support structure 600. The transport support structure 600 according to the embodiment shown in FIG. 15 can correspond to the transport support structure of the embodiments shown in FIGS. 13A to 13C and FIG. 14.

Figure 16:
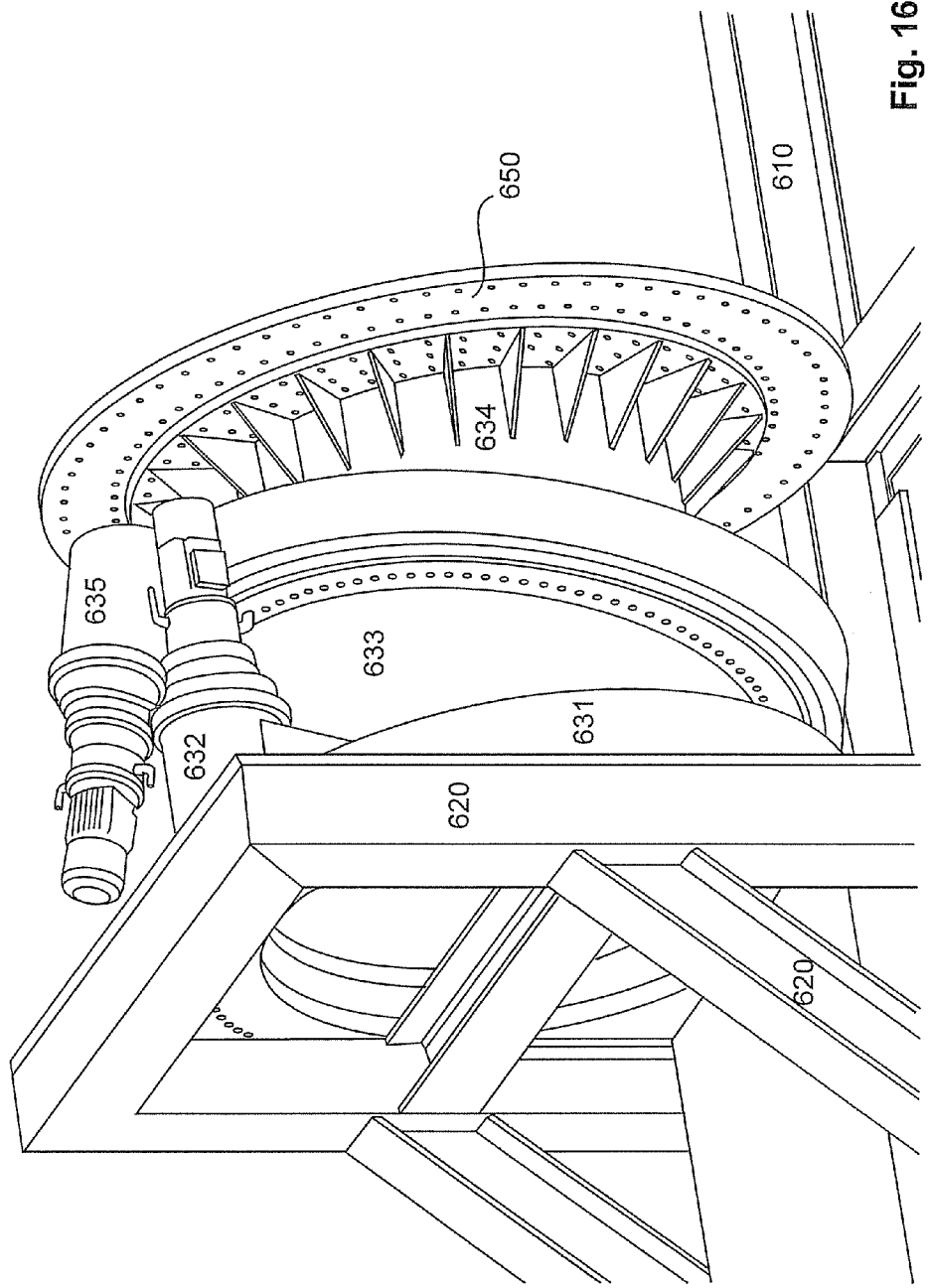
FIG. 16 shows a perspective partial view of the transport support structure in accordance with one embodiment.

FIG. 16 shows a perspective view of the rotary displacement unit 630 of a transport support structure in accordance with one embodiment. The transport support structure can correspond to the transport support structure of the embodiments shown in FIGS. 13A to 13C and FIG. 14. Thus, the transport support structure has a main frame 610, a receiving frame 620 and a rotary displacement unit 630. The rotary displacement unit 630 has a first rotary mounting 631 and a second rotary mounting 634. Provided between the first and second rotary mountings 631, 634 is a first portion 633 while between the second rotary mounting 634 and an end of the rotary displacement unit 630 there is a second portion 634 of the rotary displacement unit 630. The first rotary mounting 631 can be driven by way of a first drive 632 and the second rotary mounting 634 can be driven by way of a second drive 635.

Figure 17A:
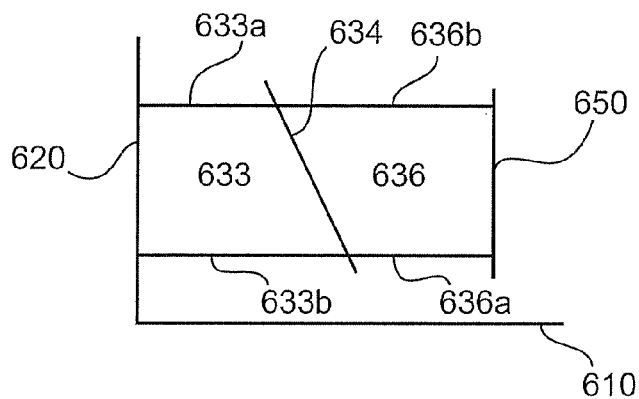
FIGS. 17A and 17B each show a diagrammatic view of a transport support structure in accordance with one embodiment.
Figure 17B:
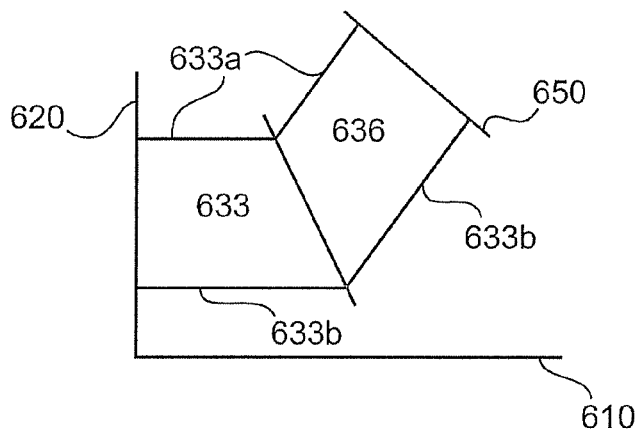

FIGS. 17A and 17B each show a diagrammatic view of a transport support structure in accordance with one embodiment, which can be based on that of the embodiments shown in 13A to 13C and FIG. 14. The transport support structure has a main bearer or main frame 610, a receiving frame 620 and a rotary displacement unit 630. The rotary displacement unit 630 has a rotary mounting 634 provided at an angle to a main plane, wherein the main plane is defined by the main bearer or main frame 610. In particular the rotary plane of the first rotary mounting 634 is provided at an angle of less than 90°. The rotary displacement unit 630 has a first portion 633 fixed to the receiving frame 620. The rotary displacement unit 630 has a second portion provided between the rotary mounting 634 and the blade adaptor 650.

FIG. 17A shows a first operating condition. In this case, the plane of the blade adaptor 650 is substantially parallel to the plane of the receiving frame 620. Accordingly the plane of the blade adaptor 650 can also be at a right angle to the main plane.

FIG. 17B shows a second operating condition. In this case, the first rotary mounting has been rotated through 180°. In FIGS. 17A and 17B, a shorter end 633a of the first portion is upward and the longer end 633b is downward. In FIG. 17A, the longer end 636b of the second portion is upward and the shorter end 636a is downward. In the situation shown in FIG. 17B, in accordance with the second operating condition the first shorter portion 633a adjoins the first shorter portion 636b of the second portion. Likewise the longer portion 636b of the first portion adjoins the longer end 636b of the second portion. Thus there is an angle between the plane of the receiving frame 620 and the plane of the blade adaptor 650. In a corresponding fashion there is a further angle between the main plane and the plane of the blade adaptor 650, which angle corresponds to the angle of the rotary plane. In other words, in the second operating condition as shown in FIG. 17B, the plane of the blade adaptor 650 is parallel to the rotary plane of the rotary mounting 634.

Figure 18:
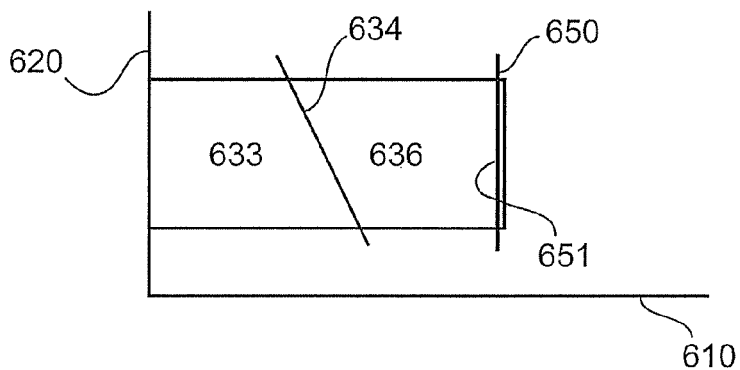
FIG. 18 shows a diagrammatic view of a transport support structure in accordance with one embodiment.

FIG. 18 shows a diagrammatic view of a transport support structure in accordance with one embodiment, which can be based on the transport support structure of the embodiment shown and described with respect to FIGS. 17A and 17B. In addition to the rotary displacement unit in accordance with the embodiment shown and described with respect to FIGS. 17A and 17B, the rotary displacement unit in accordance with the embodiment shown in FIG. 18 has a rotary mounting 651 at its second end, that is to say a rotary mounting 651 on the blade adaptor 650. That rotary mounting 651 at the lower region of the blade adaptor 650 means that a rotor blade fixed to the blade adaptor 650 can be rotated along its longitudinal axis.

Figure 19:
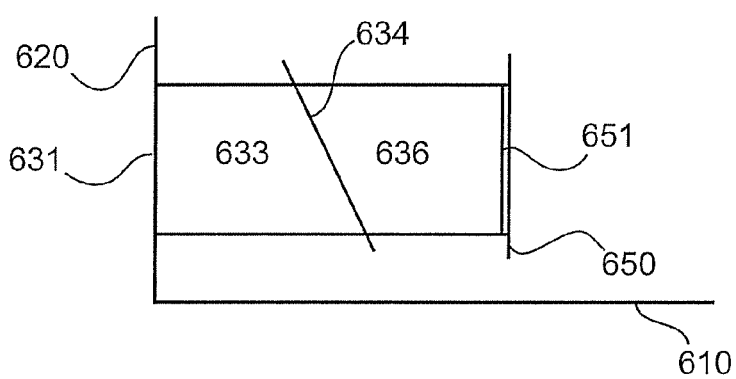
FIG. 19 shows a diagrammatic view of a transport support structure in accordance with one embodiment.

FIG. 19 shows a diagrammatic view of a transport support structure in accordance with another embodiment, which can also be based on the transport support structure in accordance with the embodiments shown and described with respect to FIGS. 17A, 17B and 18 or a combination thereof. In the embodiment shown in FIG. 19, there is a rotary mounting 631 at the transition between the receiving frame 620 and the first portion 633, a second rotary mounting 634 at the transition from the first to the second portions 633, 636 and a third rotary mounting 651 at the transition between the second portion 636 and the blade adaptor 650.

Embodiments of the present invention concern a transport vehicle for transporting wind power installation rotor blades and/or wind power installation pylon segments. The transport vehicle has a transport support structure 600, wherein the transport support structure 600 has a main frame or a main bearer 610, a receiving frame 620 fixedly connected to the main frame 610 at a first angle and a rotary displacement unit 630. The rotary displacement unit is coupled with its first end to the receiving frame 620 and at its second end there is coupled a blade adaptor 650 for receiving a rotor blade or a pylon segment. The receiving frame has a receiving plane. The rotary displacement unit has at least one first rotary mounting 634, wherein there is a second angle between the main plane of the main frame 610 and the first rotary plane of the first rotary mounting 634. That second angle is different from 90°±10°.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transport vehicle for transporting wind power installation rotor blades and/or pylon segments, the transport vehicle comprising:
a transport support structure that includes:
a main frame having a surface that extends in a main plane,
a receiving frame fixedly connected to the main frame, and
a rotary displacement unit having a first end and a second end, the first end fixed to the receiving frame and the second end having a blade adaptor for receiving a rotor blade or a pylon segment, wherein the rotary displacement unit has a first rotary mounting between the first and second ends that is rotatable relative to the receiving frame and is configured to be located in a first position such that the second end of the rotary displacement unit is in a first plane that is substantially orthogonal with the main plane and in a second position such that the second end of the rotary displacement unit is in a second plane that is not orthogonal to the main plane.

2. A transport vehicle according to claim 1 wherein the rotary displacement unit has a second rotary mounting, wherein a first portion is provided between the first and second rotary mountings, and
wherein a second portion is provided between the first rotary mounting and the blade adaptor.

3. A transport vehicle according to claim 2 wherein the first and second portions of the rotary displacement unit respectively have a first and a second end, wherein the first ends are each shorter than the second ends.

4. A transport vehicle according to claim 3 wherein in a first operating condition the second rotary mounting is rotatable so the first end of the first portion points downwardly and the first rotary mounting is rotatable so the second end of the second portion points downwardly, and
wherein in a second operating condition the second rotary mounting is rotatable so the second end of the first portion points downwardly and the first rotary mounting is rotatable so the second end of the second portion points downwardly so that the blade adaptor is inclined.

5. A transport vehicle according to claim 1 wherein the rotary displacement unit has a second rotary mounting at the second end thereof, wherein provided between the first and second rotary mountings is a first portion, and wherein a second portion is provided between the first rotary mounting and the receiving frame.

6. A transport support structure according to claim 1 wherein the rotary displacement unit includes a member between the first rotary mounting and the second end of the rotary displacement unit, the member having an upper portion with a first longitudinal length and a lower portion with a second longitudinal length, the first longitudinal length being longer than the second longitudinal length.

7. A transport support structure according to claim 6 wherein the first rotary member extends at an angle relative to the main plane that is transverse but not perpendicular with the main plane by more than 10 degrees.

8. A transport support structure according to claim 6 wherein the first rotary member extends at an angle relative to the main plane that is transverse but not perpendicular with the main plane by more than 10 degrees.

9. A transport support structure comprising:
a main frame having a surface in a first plane;
a receiving frame fixedly connected to the main frame such that a surface of the receiving frame extends in a second plane that is orthogonal to the first plane; and
a rotary displacement unit having a first end and a second end, the first end fixed to the receiving frame and the second end having a blade adaptor for receiving a rotor blade or a pylon segment, the rotary displacement unit having at least one first rotary mounting in a first rotary plane that is non-parallel and non-orthogonal to the first and second planes.

10. A transport support structure according to claim 9 wherein the rotary displacement unit includes a member between the first rotary mounting and the second end of the rotary displacement unit, the member having an upper portion with a first longitudinal length and a lower portion with a second longitudinal length, the first longitudinal length being longer than the second longitudinal length.

11. A transport support structure to support a rotor blade or a pylon segment of a wind power installation during transport, the transport support structure comprising:
a main frame having a surface;
a receiving frame fixedly attached to the main frame to extend therefrom, the receiving frame defining a receiving plane that is perpendicular to the surface of the main frame;
a rotary displacement unit having a first end and a second end and having a rotary mount between the first end and the second end that defines a rotary plane, the first end of the rotary displacement unit coupled to the receiving frame with the rotary plane of the rotary mount non-parallel to the receiving plane and non-parallel to the surface of the main frame; and
an adaptor coupled to the second end of the rotary displacement unit to receive the rotor blade or the pylon segment during transport.

12. A transport support structure according to claim 11, wherein the rotary mount is configured to rotate between a first position in which a surface of the adaptor extends in a first plane that is parallel to a surface of the receiving frame and a second position in which the surface of the adaptor extends in a second plane that is not parallel with the receiving plane and the surface of the main frame.

* * * * *